(12) United States Patent
Toth

(10) Patent No.: US 9,929,560 B2
(45) Date of Patent: Mar. 27, 2018

(54) DC/DC CONVERTER FOR HYBRID SYSTEM

(75) Inventor: Antoine Toth, Delemont (CH)

(73) Assignee: Belenos Clean Power Holding AG, Bienne (CH)

( * ) Notice: Subject to any disclaimer, the term of this patent is extended or adjusted under 35 U.S.C. 154(b) by 768 days.

(21) Appl. No.: 14/238,424

(22) PCT Filed: Aug. 17, 2012

(86) PCT No.: PCT/EP2012/066142
§ 371 (c)(1),
(2), (4) Date: Feb. 11, 2014

(87) PCT Pub. No.: WO2013/024172
PCT Pub. Date: Feb. 21, 2013

(65) Prior Publication Data
US 2014/0191594 A1    Jul. 10, 2014

(30) Foreign Application Priority Data

Aug. 17, 2011    (EP) .................................... 11177869

(51) Int. Cl.
  *H02J 1/06*    (2006.01)
  *H02M 3/158*   (2006.01)
  *H02J 1/10*    (2006.01)

(52) U.S. Cl.
CPC ............... *H02J 1/06* (2013.01); *H02J 1/102* (2013.01); *H02M 3/1584* (2013.01)

(58) Field of Classification Search
CPC ............................ H02M 3/158; H02M 3/1584
See application file for complete search history.

(56) References Cited

U.S. PATENT DOCUMENTS

| 5,920,475 | A | 7/1999 | Boylan et al. |
| 5,956,245 | A | 9/1999 | Rozman |
| 6,038,154 | A | 3/2000 | Boylan et al. |
| 6,154,381 | A | 11/2000 | Kajouke et al. |
| 6,191,964 | B1 | 2/2001 | Boylan et al. |
| 6,281,666 | B1 | 8/2001 | Tressler et al. |
| 7,535,204 | B1 * | 5/2009 | Nadimpalli ......... H02M 3/1584 323/222 |
| 7,696,734 | B2 * | 4/2010 | Endo .................. H02M 3/1584 323/272 |

(Continued)

FOREIGN PATENT DOCUMENTS

EP    1 705 787 A1    9/2006

OTHER PUBLICATIONS

International Search Report dated Apr. 12, 2012, in PCT/EP2012/066142, filed Aug. 17, 2012.

*Primary Examiner* — Jeffrey Shin
(74) *Attorney, Agent, or Firm* — Oblon, McClelland, Maier & Neustadt, L.L.P.

(57) ABSTRACT

A DC/DC converter including a control unit configured to control a voltage variation mechanism, the voltage variation mechanism including a plurality of variable voltage regulator circuits each controlled by a switching signal. The variable voltage regulator circuits are grouped together in plural modules each controlled by a control signal sent by the control unit and the switching signals of the variable voltage regulator circuits of a same module are phase shifted in relation to each other, and the control signals of the modules are also phase shifted in relation to each other.

6 Claims, 2 Drawing Sheets

(56) References Cited

U.S. PATENT DOCUMENTS

| | | |
|---|---|---|
| 2002/0135338 A1 | 9/2002 | Hobrecht |
| 2006/0203524 A1 | 9/2006 | Ohno et al. |
| 2006/0239046 A1* | 10/2006 | Zane .................. H02M 3/1584 363/65 |
| 2006/0291260 A1* | 12/2006 | Nakashima ......... H02M 3/1584 363/65 |
| 2007/0024360 A1 | 2/2007 | Markowski |
| 2009/0261908 A1 | 10/2009 | Markowski |
| 2011/0127923 A1* | 6/2011 | Lin .................... H05B 33/0815 315/193 |
| 2013/0241519 A1* | 9/2013 | Li ...................... H02M 3/1584 323/311 |

* cited by examiner

DC/DC CONVERTER FOR HYBRID SYSTEM

CROSS-REFERENCE TO RELATED APPLICATIONS

This is a National phase application in the United States of International Patent Application PCT/EP2012/066142 filed Aug. 17, 2012 which claims priority on European patent application No. 11177869.2 filed Aug. 17, 2011. The entire disclosures of the above patent applications are hereby incorporated by reference.

The present invention concerns a DC/DC converter including a control unit arranged to control a voltage variation means, said voltage variation means including a plurality of variable voltage regulator circuits each controlled by a switching signal.

BACKGROUND OF THE INVENTION

The present invention concerns a DC/DC converter used in a hybrid system. This hybrid system 1, seen in FIG. 1, includes a fuel cell stack 2, i.e. a plurality of series-connected electrochemical cells. This fuel cell stack 2 is powered by a reducing fuel such as hydrogen and by an oxidising agent such as oxygen. The reaction between the reducing fuel and the oxidising agent generates the fuel cell voltage. The gases derived from the reaction between the reducing fuel and the oxidising agent may be evacuated via recirculation circuits equipped with recirculation pumps. Hybrid system 1 also includes a means of storing energy 6 such as one or several batteries. In the remainder of the description, this means of storing electrical energy will be assumed to be a battery 6 but there is nothing to prevent several batteries being used. This battery 6 provides a battery voltage and is connected in parallel to fuel cell stack 2 so that fuel cell stack 2 and battery 6 are both connected to a variable load 8. This variable load 8 may be, for example, a car engine.

This hybrid system 1 thus includes a DC/DC converter 4 also called a boost or step-up and/or step-down converter comprising two inputs and two outputs. The outputs of fuel cell stack 2 are connected to the two inputs of the DC/DC converter 4, which therefore means that the voltage supplied by the fuel cell stack 2 enters DC/DC converter 4. The connection points of variable load 8 and battery 6 are connected to the two outputs of DC/DC converter 4. DC/DC converter 4 is also arranged to control hybrid system 1 since DC/DC converter 4 is capable of adapting the voltage and current level of fuel cell stack 2 and also that of battery 6. Likewise, the DC/DC converter can regulate the power delivered by fuel cell stack 2.

Indeed, the role of DC/DC converter 4 is to control hybrid system 1 so that battery 6 and fuel cell stack 2 operate together to power load 8. The function of the DC/DC converter is also to distribute the power supplied by the fuel cell stack between the load, which is the electric motor in an automobile application, and the battery, and to maintain the battery charge level at a determined level. The control of hybrid system 1 is of course subject to constraints, which are the voltage and current limits of fuel cell stack 2, the voltage and current limits of battery 6, the state of charge limits of battery 6, the temperature limits that must not be exceeded etc.

It is known that this type of DC/DC converter 4, visible in FIG. 2, includes at least one variable voltage regulator circuit 10 including an input opening on a first filtering capacitor 11 connected in parallel to earth and across a coil 12 series-connected to a diode 14. At the connection point between coil 12 and diode 14, a switching means 13 is connected in parallel and connected to earth. The output of diode 14 is connected to the output where there is arranged a second filtering capacitor 11 connected in parallel to earth. The switching means 13 which may, for example, be a transistor, is frequency controlled by a control signal.

One drawback of this DC/DC converter is that it is bulky since the space taken by the DC/DC converter is proportional to its power. Indeed, the power of this type of DC/DC converter is connected to the impedance of the components. The impedance of a coil or a capacitor is linked to the frequency and to the value of said coil and capacitor. With a defined frequency, the capacitance value of the capacitor and the inductance value of the coil must be increased in order to increase the impedance. This then causes an increase in the size of the components and thus an increase in the size of the DC/DC converter, not to mention an increase in costs.

SUMMARY OF THE INVENTION

It is therefore an object of the present invention to provide a DC/DC converter which overcomes the drawbacks of the prior art, i.e. by providing a DC/DC converter which is more compact and less expensive yet offers at least equivalent efficiency.

The present invention therefore concerns a DC/DC converter including a control unit arranged to control a voltage variation means, said voltage variation means including a plurality of variable voltage regulator circuits each controlled by a switching signal, characterized in that said variable voltage regulator circuits are grouped together in several modules each controlled by a control signal sent by the control unit and in that the switching signals of the variable voltage regulator circuits of the same module are phase shifted in relation to each other and in that the control signals of the modules are also phase shifted in relation to each other.

Advantageous embodiments of the converter of the present invention form the subject of dependent claims.

In a first advantageous embodiment, the switching signals of the variable voltage regulator circuits of the same module are phase shifted by T/4 in relation to each other.

In a second advantageous embodiment, the control signals of the modules are phase shifted by T/16 in relation to each other.

In another advantageous embodiment, each variable voltage regulator circuit includes an input opening on a first filtering capacitor, connected in parallel to earth and in series across a coil, which is in turn series-connected with a diode, a switching means being connected, at the connection point between the coil and the diode, in parallel and connected to earth, the diode output being connected to the output where there is arranged a second filtering capacitor connected in parallel to earth.

The invention also concerns a hybrid system including a fuel cell stack connected to a variable load via a DC/DC converter, said hybrid system further including an energy storage means connected to the DC/DC converter and to the variable load, characterized in that the DC/DC converter is the DC/DC converter according to any of the preceding claims.

BRIEF DESCRIPTION OF THE DRAWINGS

The objects, advantages and features of the converter according to the present invention will appear more clearly in the following detailed description of at least one embodiment of the invention, given solely by way of non-limiting example and illustrated by the annexed drawings, in which.

DETAILED DESCRIPTION OF THE INVENTION

Figure 1:
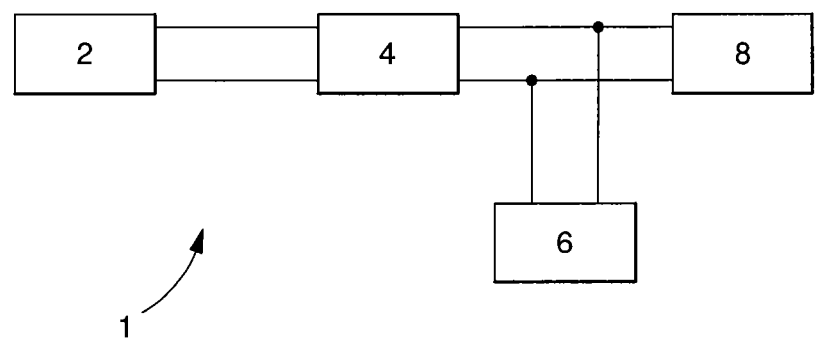
FIG. 1 is a schematic view of a known hybrid system.
Figure 2:
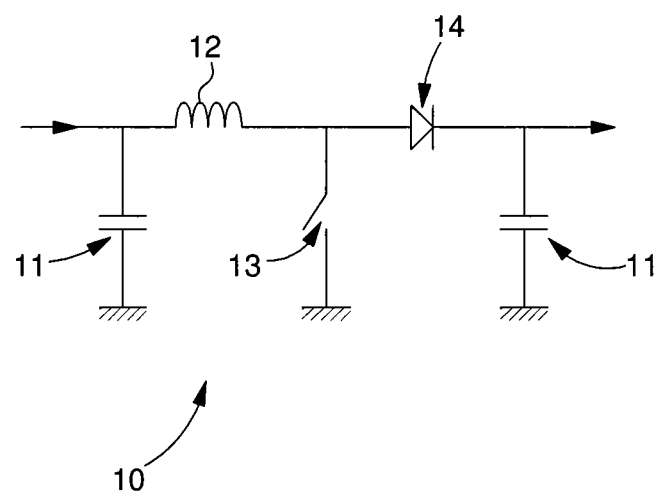
FIG. 2 is a schematic view of a known variable voltage regulator circuit.
Figure 3:
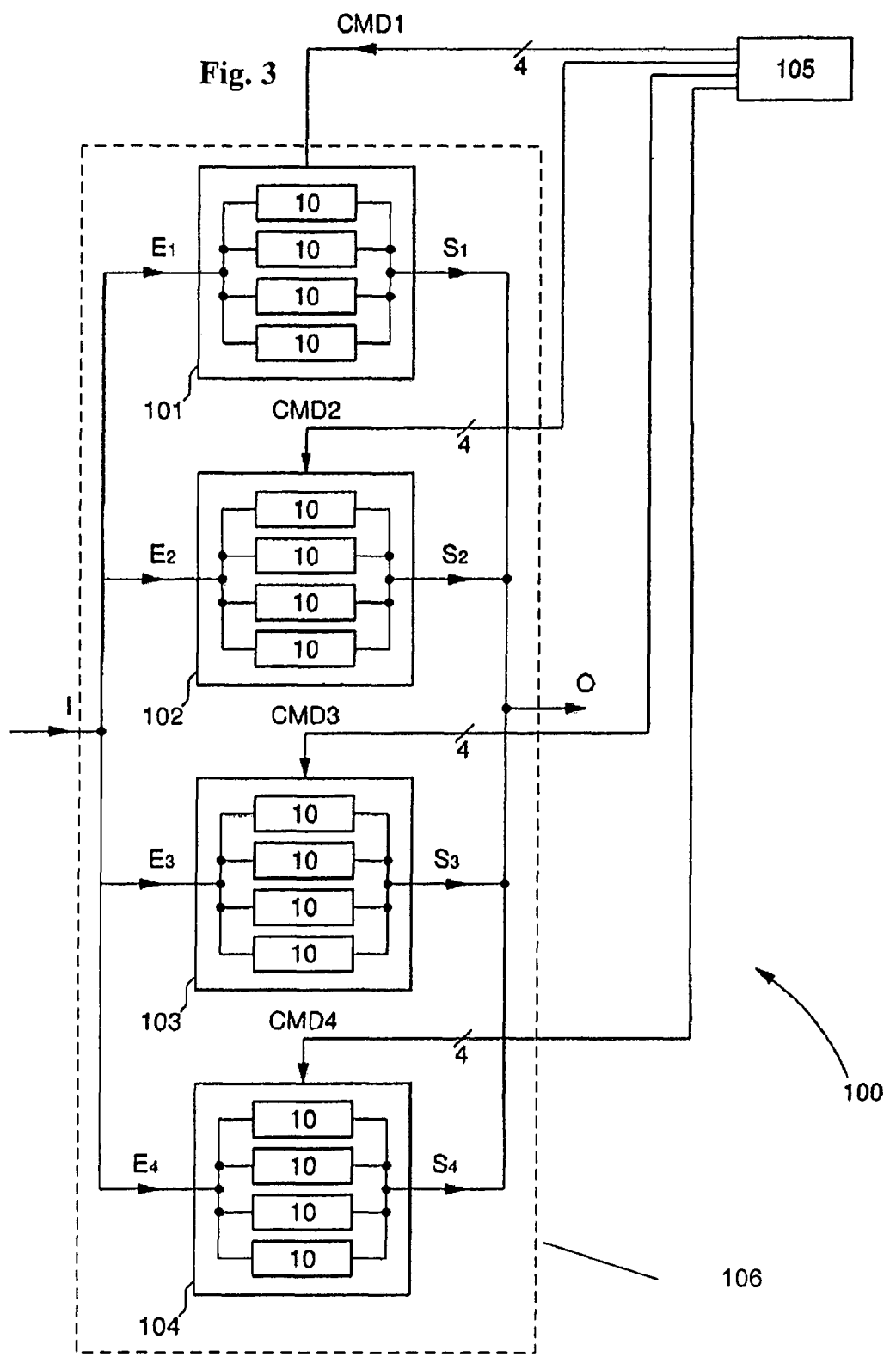
FIG. 3 is a schematic view of the DC/DC converter according to the invention.

DC/DC converter 100 in FIG. 3 includes a control unit 105 arranged to control a voltage variation means 106. This means 106 includes a main input (I) and a main output (O). In the example of FIG. 3, which will be used for the rest of the description, the DC/DC converter 100 is a DC/DC boost converter.

This means 106 includes several booster circuits 10 as described above. It will be clear that this variable voltage regulator circuit 10 includes an input opening on a first filtering capacitor 11 connected in parallel to earth and in series across a coil 12 which is in turn in series connected with a diode 14. At the point of connection between coil 12 and diode 14, a switching means 13 is connected in parallel and connected to earth. The output of diode 14 is connected to the output where there is arranged a second filtering capacitor 11 connected in parallel to earth. Switching means 13 is a MOSFET or bipolar or IGBT transistor frequency controlled by control unit 105 and by a switching signal.

Advantageously according to the invention, booster circuits 10 are grouped together in the form of at least one module 101, 102, 103, 104. In particular, the voltage variation means 106 includes four modules 101, 102, 103, 104 in parallel, each including four parallel connected booster circuits 10. Each module 101, 102, 103, 104 includes an input E1, E2, E3, E4 and an output S1, S2, S3, S4, outputs E1, E2, E3, E4 being connected to the main input (I) and outputs S1, S2, S3, S4 being connected to the main output (O). Each module 101, 102, 103, 104 is controlled by control unit 105 via control signals CMD1, CMD2, CMD3, CMD4.

This configuration makes it possible to control voltage variation means 106 in a phase-shifted manner.

Firstly, variable voltage regulator circuits 10 of each module 101, 102, 103, 104 are advantageously frequency controlled so as to be phase shifted in relation to each other. This means that variable voltage regulator circuits 10 of one module 101, 102, 103, 104 all receive at the same time a switching signal acting on switching means 13 of each circuit 10 and originating from control unit 105, but the control signals are phase shifted in relation to each other. This enables the switching means 13 of the variable voltage regulator circuits 10 to switch at different times. In the present case where each module 101, 102, 103, 104 includes four booster circuits 10, the control signals are phase shifted by T/4 in relation to each other. This phase shift makes it possible to virtually switch four times in a single period of the switching signals. Thus the frequency which is seen by the components, such as capacitors 11, is multiplied by four.

Secondly, the fact that there are modules 101, 102, 103, 104, means that each module 101, 102, 103, 104 must be selected one after the other, via control signals CMD1, CMD2, CMD3, CMD4, so that only one module 101, 102, 103, 104 is active at a given moment. The invention advantageously also proposes to phase shift control signals CMD1, CMD2, CMD3, CMD4 in relation to each other. In the case with four modules 101, 102, 103, 104, the phase shift is T/16 in relation to each other. This makes it possible to further multiple the virtual frequency seen by capacitors 11.

Indeed, control signal CMD1 is sent to first module 101 to start the switching of switching means 13 of circuits 10 of said module 101. Then, with a phase shift of T/16 relative to control signal CMD1, control signal CMD2 is sent to second module 102 to start the switching of switching means 13 of circuits 10 of said module 102. Control signal CMD3 is sent to third module 103 with a phase shift of T/16 relative to control signal CMD2 to start the switching of switching means 13 of circuits 10 of said module 103. Finally, control signal CMD4 is sent to the fourth module 104 with a phase shift of T/16 relative to control signal CMD3.

Thus, in a quarter period, control signals CMD1, CMD2, CMD3, CMD4 have all been sent to modules 101, 102, 103, 104. Since the switching of switching means 13 of circuits 10 of each module is also phase shifted, the frequency seen by capacitors 11 is multiplied. In the present case with four modules 101, 102, 103, 104, each having four variable voltage regulator circuits 10, the virtual frequency seen by capacitors 11 is multiplied by 16. For, example, if the signals sent by control unit 105 are at a frequency of 100 kHz, the virtual frequency is 1.6 GHz. Of course, the operating frequency of DC/DC converter 100 will depend on the technology utilised for its components.

Consequently, if the frequency increases, the value of capacitors 11 may be decreased. Since the size of these components is proportional to their value, components having a lower value and occupying a smaller surface area make it possible to reduce the size of DC/DC converter 100. The saving is large enough for the increased number of the variable voltage regulator circuits 10 not to cause a problem.

It will be clear that various alterations and/or improvements evident to those skilled in the art may be made to the various embodiments of the invention described in this description without departing from the scope of the invention.

The invention claimed is:

1. A DC/DC converter comprising:
control circuitry configured to control a voltage variation circuit, the voltage variation circuit including a plurality of variable voltage regulator circuits each controlled by a switching signal,
wherein the variable voltage regulator circuits are grouped together in plural modules each controlled by a control signal sent by the control circuitry,
the switching signals of the variable voltage regulator circuits of a same module are phase shifted in relation to each other,
the control signals of the modules are also phase shifted in relation to each other,
the switching signals are received by each of the variable voltage regulator circuits of the same module at the same time, and
only one module is active at a given moment.

2. The DC/DC converter according to claim 1, wherein the switching signals of the variable voltage regulator circuits of the same module are phase shifted by T/4 in relation to each other.

3. The DC/DC converter according to claim 1, wherein the control signals of the modules are phase shifted by T/16 in relation to each other.

4. The DC/DC converter according to claim 2, wherein the control signals of the modules are phase shifted by T/16 in relation to each other.

5. The DC/DC converter according to claim 1, wherein each variable voltage regulator circuit includes an input opening on a first filtering capacitor, connected in parallel to ground and in series across a coil, which is in turn series-connected with a diode, a switch being connected, at a connection point between the coil and the diode, in parallel and connected to ground, the diode output being connected to an output where there is arranged a second filtering capacitor connected in parallel to ground.

6. A hybrid system comprising:
   a fuel cell stack connected to a variable load via a DC/DC converter; and
   an energy storage directly connected to an output of the DC/DC converter and directly connected to an input of the variable load,
   wherein the DC/DC converter includes:
      control circuitry configured to control a voltage variation circuit, the voltage variation circuit including a plurality of variable voltage regulator circuits each controlled by a switching signal,
   wherein the variable voltage regulator circuits are grouped together in plural modules each controlled by a control signal sent by the control circuitry,
   the switching signals of the variable voltage regulator circuits of a same module are phase shifted in relation to each other,
   the control signals of the modules are also phase shifted in relation to each other, and
   the switching signals are received by each of the variable voltage regulator circuits of the same module at the same time.

\* \* \* \* \*